United States Patent
Roulland et al.

(10) Patent No.: US 7,797,303 B2
(45) Date of Patent: Sep. 14, 2010

(54) NATURAL LANGUAGE PROCESSING FOR DEVELOPING QUERIES

(75) Inventors: Frederic Roulland, St Nazaire les Eymes (FR); Aaron Kaplan, Grenoble (FR); Stefania Castellani, Meylan (FR); Claude Roux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1248 days.

(21) Appl. No.: 11/354,688

(22) Filed: Feb. 15, 2006

(65) Prior Publication Data

US 2007/0192085 A1 Aug. 16, 2007

(51) Int. Cl.
G06F 7/00 (2006.01)
G06F 17/00 (2006.01)

(52) U.S. Cl. ...................... 707/713; 707/708
(58) Field of Classification Search ........................ None
See application file for complete search history.

(56) References Cited

U.S. PATENT DOCUMENTS

| | | | |
|---|---|---|---|
| 6,263,335 B1 | 7/2001 | Paik et al. | |
| 6,405,162 B1 | 6/2002 | Segond et al. | |
| 6,678,677 B2 | 1/2004 | Roux et al. | |
| 6,735,622 B1 * | 5/2004 | Andreoli et al. | 709/219 |
| 6,915,300 B1 | 7/2005 | Roux et al. | |
| 6,947,923 B2 | 9/2005 | Cha et al. | |
| 6,970,881 B1 | 11/2005 | Mohan et al. | |
| 7,058,567 B2 | 6/2006 | Ait-Mokhtar et al. | |
| 2004/0125403 A1 | 7/2004 | Furst et al. | |
| 2005/0137847 A1 | 6/2005 | Brun et al. | |
| 2005/0138000 A1 | 6/2005 | Roux et al. | |
| 2005/0138556 A1 | 6/2005 | Brun et al. | |
| 2005/0172018 A1 | 8/2005 | Devine et al. | |

FOREIGN PATENT DOCUMENTS

| | | |
|---|---|---|
| WO | WO 99/05618 | 2/1999 |
| WO | WO 2004/114163 A2 | 12/2004 |

OTHER PUBLICATIONS

Edgar et al, "A User Evaluation of Hierarchical Phrase Browsing", In Proc. European Conference on Digital Libraries, 2003.*

(Continued)

*Primary Examiner*—David R Hudspeth
*Assistant Examiner*—Samuel G Neway
(74) *Attorney, Agent, or Firm*—Fay Sharpe LLP

(57) ABSTRACT

A system suited to self-troubleshooting includes a processor which identifies normalized forms of at least some of the words of a natural language user query input by a user. The user query may describe a problem experienced with a machine, such as a printer. The processor retrieves text strings which may comprise problem statements stored in memory. Each retrieved problem statement includes at least one word with a normalized form which is recognized by the processor as being equivalent to one of the identified normalized forms. Each of the retrieved problem statements may be associated with at least one solution sequence for addressing the problem with the machine. In the event that the stored problem statements in memory are not fully responsive, the processor provides one or more options for refinement of the user query based on tags associated with those words of the problem statements which are responsive.

29 Claims, 9 Drawing Sheets

OTHER PUBLICATIONS

Anick et al, "The Paraphrase Search Assistant: Terminological Feedback for Iterative Information Seeking", In SIGIR '99: Proceedings of the 22nd annual international ACM SIGIR conference on Research and in information retrieval (1999), pp. 153-159.*
L.Alamarguy, R.Dieng-Kuntz, C.Faron-Zucker, *Extraction of Lexico-Syntactic Information and Acquisition of Casuality Schemas for Text Annotation,* Internet XP019015649, pp. 1180-1186, 2005.
Ait-Mokhtar S., Hagege C., Sandor A., *Problems D'Intersubjectivite dans L'Evaluation des Analyseurs Syntaxiques,* TALN Conference, Batz-sur-mer, France, Jun. 11-14, 2003.
Ait-Mokhtar, et al., *Robustness Beyond Shallowness: Incremental Dependency Parsing,* NLE Journal, 2002.
James Allan, *Relevance Feedback with too Data,* Proceedings of the 18th Annual International ACM SIGIR Conference on Research and Development in Information Retrieval, 1995.
Robert C. Berwick, *Parsing by Chunks,* Principle-Based Parsing Computation and Psycholinguistics, pp. 257-278, Kluwer Academic Publishers, Boston, 1991.
David W. Aha, *Supporting Dialogue Inferencing in Conversational Case-Based Reasoning,* Proceedings of EWCBR, 1998.
U.S. Appl. No. 11/013,366, filed Dec. 15, 2004, Brun, et al.
U.S. Appl. No. 11/018,758, filed Dec. 15, 2004, Brun, et al.
U.S. Appl. No. 11/018,892, filed Dec. 21, 2004, Brun, et al.
U.S. Appl. No. 11/173,136, filed Dec. 20, 2004, Sandor, et al.
U.S. Appl. No. 11/173,680, filed Dec. 20, 2004, Sandor, et al.
U.S. Appl. No. 11/202,549, filed Aug. 12, 2005, Brun.
U.S. Appl. No. 11/341,788, filed Jan. 27, 2006, Segond, et al.
D. Carmel, *Automatic Query Refinement Using Lexical Affinities with Maximal Information Gain,* Proceedings of the 25th Annual International ACM SIGIR Conference on Research and Development in Information Retrieval, 2002.
Kalyan Gupta, *A Framework for Incremental Query Formulation in Mixed-Initiative Case-Based Reasoning,* Proceedings of ICCBR Mixed-Initiative Case-Based Reasoning Workshop, 2003.
Fredrik V. Jensen, *The SACSO System for Troubleshooting of Printing Systems,* Proceedings of SCAI, pp. 67-79, 2001.
Y. Jing, *Association Thesaurus for Information Retrieval,* Proceedings of RIAO, 1994.
Byeong H. Kang, *Help Desk System with Intelligent Interface,* Applied Artifical Intelligence, vol. 11, No. 7, pp. 611-631(21), Dec. 1, 1997.
Ait-Mokhtar, et al., *Subject and Object Dependency Extraction Using Finite-State Transducers,* Proceedings ACL'97 Workshop on Information Extraction and the Building of Lexical Semantic Resources for NLP Applications, Madrid, Jul. 1997.
Ait-Mokhtar S., Chanod J.P., Roux C., *A Multi-Input Dual-Entry Point Dependency Parser,* Proceedings of the Seventh IWPT (International Workshop on Parsing Technologies), Beijing, China, Oct. 17-19, 2001.
Jacki O'Neill, *Using Real-Life Troubleshooting Interactions to Inform Self-Assistance Design,* Proceedings of INTERACT, Rome, Italy, Sep. 12-16, 2005.
Reiner Kraft, *Mining Anchor Text for Query Refinement,* Proceedings of the 13th International World Wide Web Conference, 2004.
From Factoids to Facts, *The Economist,* pp. 68-69, Aug. 28, 2004.
Alcouffe P., Gacon N., Roux C., Segond F., *A Step Toward Semantic Indexing of an Encyclopedic Corpus, Proceedings of LREC,* Athens, Jul. 2000.
http://www.inxight.com.pdfs/FactsExtraction⁻Web.pdf.
Ait-Mokhtar, et al., *Incremental Finite-State Parsing,* Proceedings of Applied Natural Language Processing, Washington, Apr. 1997.
Brun C. & Segond F., *Semantic Encoding of Electronic Documents,* vol. 6 No. 1 of the International Journal of Corpus Linguistics, 2001.
Brun C. & Hagege C., *Intertwining Deep Syntactic Processing and Named Entity Detection,* ESTAL 2004, Alicante, Spain, Oct. 20-22, 2004.
Brun C. & Hagege C., *Normalizatin and Paraphrasing Using Symbolic Methods,* ACL, Second International Workshop on Paraphrasing, Paraphrase Acquisition and Applications, Sapporo, Japan, Jul. 7-12, 2003.
Hagege C. & Roux C., *Entre Syntaxe et Semantique: Normalisation de la Sortie de L'Analyse Syntaxique en vue de L'Amelioration de L'Extraction D'Information a Partir de Textes, TALN,* Batz-sur-mer, France, Jun. 11-14, 2003.
Hull D., Ait-Mokhtar S., Chuat M., Eisele A., Gaussier E., Grefenstette G., Isabelle P., Samuelsson C. & Segond F., *Language Technologies and Patent Search and Classification,* World Patent Information 23, pp. 265-268, 2001.
Jacquemin B., Brun C. & Roux C., *Enriching a Text by Semantic Disambiguation for Information Extraction, Conference Proceedings LREC,* Las Palmas, Spain, Jun. 2, 2002.
Kaplan A., *Towards a Consistent Logical Framework for Ontological Analysis,* Proceedings of the International Conference on Formal Ontology in Information Systems, Ogunquit, Maine, Oct. 2001.
Richardson S., *Determining Similarity and Inferring Relations in a Lexical Knowledge Base,* PhD. Dissertation, City University of New York, 1997.
Segond F., Schiller A., Grefenstette G. & Chanod J.P., *An Experiment in Semantic Tagging Using Hidden Markov Model Tagging,* ACL-EACL Workshop about Lexical Semantics, Madrid, 1977.

* cited by examiner

NATURAL LANGUAGE PROCESSING FOR DEVELOPING QUERIES

CROSS REFERENCE TO RELATED PATENTS AND APPLICATIONS

The following copending applications, the disclosures of which are incorporated in their entireties by reference, are mentioned:

Application Ser. No. 11/173,136, filed Dec. 20, 2004, entitled CONCEPT MATCHING, by Agnes Sandor, et al.;

Application Ser. No. 11/173,680, filed Dec. 20, 2004, entitled CONCEPT MATCHING SYSTEM, by Agnes Sandor, et al.;

Application Ser. No. 11/287,170, filed Nov. 23, 2005, entitled CONTENT-BASED DYNAMIC EMAIL PRIORITIZER, by Caroline Brun, et al.;

Application Ser. No. 11/202,549, filed Aug. 12, 2005, entitled DOCUMENT ANONYMIZATION APPARATUS AND METHOD, by Caroline Brun;

Application Ser. No. 11/013,366, filed Dec. 15, 2004, entitled SMART STRING REPLACEMENT, by Caroline Brun, et al.;

Application Ser. No. 11/018,758, filed Dec. 21,2004, entitled BILINGUAL AUTHORING ASSISTANT FOR THE 'TIP OF THE TONGUE' PROBLEM, by Caroline Brun, et al.;

Application Ser. No. 11/018,892, filed Dec. 21, 2004, entitled BI-DIMENSIONAL REWRITING RULES FOR NATURAL LANGUAGE PROCESSING, by Caroline Brun, et al.; and, Application Ser. No. 11/341,788, filed Jan. 27, 2006, entitled LINGUISTIC USER INTERFACE, by Frederique Segond, et al.

BACKGROUND

The present exemplary embodiment relates generally to troubleshooting. It finds particular application in conjunction with a web-based system and a method for identifying solutions to problems experienced with a machine, and will be described with particular reference thereto. However, it is to be appreciated that the present exemplary embodiment is also amenable to other like applications.

Traditionally, users seeking a resolution to problems relating to complex machines, such as printers and computers, often resort to telephoning a service agent for the manufacturer who may seek to diagnose the problem over the telephone. The service agent guides the customer through a troubleshooting sequence that is intended to lead to resolution of the problem or identification of the cause. One drawback of using service agents is the expense.

A number of user-operated systems are currently available to users for self-troubleshooting problems they experience with machines. These include searchable databases which provide users with some flexibility for specifying their problems and expert systems that guide users during their searches. However, these systems usually do not help the user enough to navigate the space of possible solutions. Searchable databases are easy to create and maintain but they require a good knowledge of the database content and terminology from the user in order to produce effective search results. They are therefore more suited to expert troubleshooters. Expert system approaches offer more guidance to users but can be quite rigid and do not offer the flexibility that a more expert user would like to be provided. Some systems offer a combination of these approaches in order to satisfy the two types of users. However expert system solutions are very expensive to build and maintain and are in practice not deployed for large scale real-world troubleshooting knowledge bases.

For example, decision trees can be used to provide customers with automated diagnosis of printer systems. This approach specifies the possible troubleshooting sequences as branches of a decision tree. At each branching of the tree, one of the branches will be chosen based on the information provided by the customer at the last step. However, building a decision tree which allows for all possible diagnoses is extremely complex and can be time-consuming for the customer to navigate.

Information retrieval (IR) systems using databases or the Internet are widely used for retrieving documents associated with a query. However, in general, these keyword-based systems do not assist the user in navigating the set of matching documents.

INCORPORATION BY REFERENCE

The following references, the disclosures of which are incorporated by reference in their entireties, are mentioned:

U.S. Pat. No. 6,405,162, entitled TYPE-BASED SELECTION OF RULES FOR SEMANTICALLY DISAMBIGUATING WORDS, by Segond, et al., discloses a method of semantically disambiguating words using rules derived from two or more types of information in a corpus which are applicable to words occurring in specified contexts. The method includes obtaining context information about a context in which a semantically ambiguous word occurs in an input text and applying the appropriate rule.

U.S. Pat. No. 6,678,677, entitled APPARATUS AND METHOD FOR INFORMATION RETRIEVAL USING SELF-APPENDING SEMANTIC LATTICE, by Roux, et al., discloses a method for information retrieval using a semantic lattice.

U.S. Pat. No. 6,263,335, entitled INFORMATION EXTRACTION SYSTEM AND METHOD USING CONCEPT-RELATION-CONCEPT (CRC) TRIPLES, by Paik, et al., discloses a system which identifies a predetermined set of relationships involving named entities.

U.S. Published Application No. 20030074187, entitled NATURAL LANGUAGE PARSER, by Aït-Mokhtar, et al., discloses a parser for syntactically analyzing an input string. The parser applies a plurality of rules which describe syntactic properties of the language of the input string.

U.S. Published Application No. 20050138556, entitled CREATION OF NORMALIZED SUMMARIES USING COMMON DOMAIN MODELS FOR INPUT TEXT ANALYSIS AND OUTPUT TEXT GENERATION, by Brun, et al., discloses a method for generating a reduced body of text from an input text by establishing a domain model of the input text; associating at least one linguistic resource with said domain model, analyzing the input text on the basis of the at least one linguistic resource, and based on a result of the analysis of the input text, generating the body of text on the basis of the at least one linguistic resource.

U.S. Published Application No. 20050138000, entitled SYSTEMS AND METHODS FOR INDEXING EACH LEVEL OF THE INNER STRUCTURE OF A STRING OVER A LANGUAGE HAVING A VOCABULARY AND A GRAMMAR, by Roux, et al., discloses methods for indexing and searching the inner structure of a string over a language having a vocabulary and a grammar using bit vectors.

U.S. Published Application No. 20050137847, entitled METHOD AND APPARATUS FOR LANGUAGE LEARN- ING VIA CONTROLLED TEXT AUTHORING, by Brun, et al., discloses a method for testing a language learner's ability to create semantically coherent grammatical text in a language which includes displaying text in a graphical user interface, selecting from a menu of linguistic choices comprising at least one grammatically correct linguistic choice and at least one grammatically incorrect linguistic choice, and displaying an error message when a grammatically incorrect linguistic choice is selected.

BRIEF DESCRIPTION

Aspects of the exemplary embodiment include a troubleshooting system, a method, a system for retrieving text strings, and a storage system.

In one aspect, a troubleshooting system includes memory which stores instructions including instructions for identifying normalized forms of at least some of the words of a natural language user query input by a user, the user query describing a problem experienced with a machine, instructions for retrieving problem statements from an associated memory, each of the retrieved problem statements including at least one word with a normalized form which is recognized as equivalent to one of the identified normalized forms, each of the retrieved problem statements being associated with at least one solution sequence for addressing the problem with the machine, and instructions for refining the user's query. The instructions for refining a user's query include instructions for presenting subparts of the user's query as alternate queries and for generating a refined query based on a user-selected one of the alternate queries and instructions for presenting a plurality of expressions as query refinements and for generating a refined query based on a selected one of the expressions, each of the expressions representing a different meaning of a user query or of a refined query, where generated. A processor executes the instructions.

In another aspect, a method for retrieving text fragments responsive to a user's query includes identifying normalized forms of at least some of the words of a natural language user query input by a user, the user query describing a problem experienced with a machine, and retrieving text fragments from an associated memory, each of the retrieved text fragments including at least one word with a normalized form which is recognized as equivalent to one of the identified normalized forms. Where more than one text fragment is retrieved, the method includes refining the user's query. The refining of the user's query includes selecting at least one of three available refinements: presenting subparts of the user's query as alternate refined queries, presenting a plurality of expressions as query refinements, each of the expressions representing a different meaning of a user query or of a refined query, and presenting extensions of a refined query as alternate query refinements.

In another aspect, a system for retrieving text strings responsive to a user query includes a memory which stores indexed text strings, a processor which identifies normalized forms of at least some of the words of a natural language user query input by a user and retrieves text strings from the memory, each of the retrieved text strings including at least one word with a normalized form which is indexed as being equivalent to one of the identified normalized forms, and, where more than one text string is retrieved, refining the user's query The refinement includes at least one of presenting subparts of the user's query as alternate refined queries, presenting a plurality of expressions as query refinements, each of the expressions representing a different meaning of a user's query or of a refined query, and presenting extensions of a refined query as alternate query refinements.

In another aspect, a storage medium stores instructions which when executed by an associated processor: (a) identify normalized forms of at least some of the words of a natural language user query input by a user, the user query describing a problem experienced with a machine; (b) retrieve problem statements from an associated memory, each of the retrieved problem statements including at least one word with a normalized form which is recognized as equivalent to one of the identified normalized forms, each of the retrieved problem statements being associated with at least one solution sequence for addressing the problem with the machine; and, (c) where more than one problem statement is retrieved, refine the user's query, including at least one of: (i) presenting subparts of the user's query as alternate refined queries; (ii) presenting a plurality of expressions as query refinements, each of the expressions representing a different meaning of a user query or of a refined query; and, (iii) presenting extensions of a refined query as alternate query refinements.

DETAILED DESCRIPTION

Figure 1:
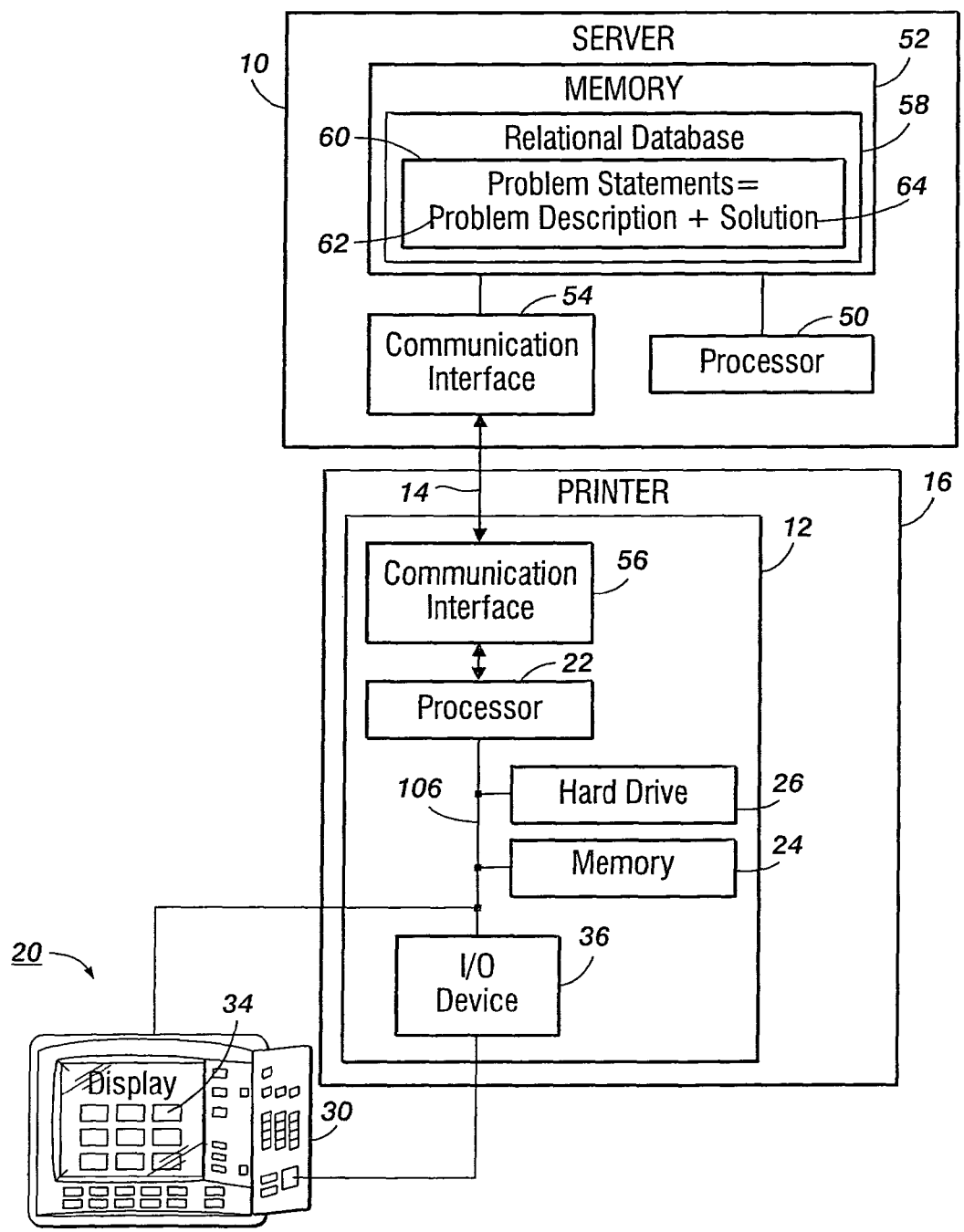
FIG. 1 is a block diagram of a troubleshooting system according to the exemplary embodiment.

Aspects of the exemplary embodiment relate to an interactive system, such as a troubleshooting system, and to a method for identifying solutions to a user query relating to a problem experienced with a machine, such as a printer or computer. As used herein, a "printer" can include any device for rendering an image on print media, such as a copier, laser printer, bookmaking machine, facsimile machine, or a multifunction machine. While the exemplary system and method are described in terms of a printer, it will be appreciated that the system and method are equally applicable to other complex machines with which a user may encounter problems that are not readily solved using the user's general experience of the machine.

In various aspects, a system suited to self-troubleshooting by a user includes a processor which helps the user iteratively to refine a description of the problem, using expressions extracted from candidate result documents as the refinement choices at each step.

In aspects of the exemplary embodiment, the troubleshooting system includes a database in which a set of defined problems which a user may encounter with a machine are stored and associated by links to one or more solutions, each of the solutions comprising a sequence of steps which address at least one known cause of the problem. The defined problems and solutions are expressed in natural language and comprise text strings. The text strings of the problems and solutions are annotated with linguistic tags through which the database is indexed. The processor accesses the database. The processor is accessible to a user, e.g., via a user interface. In various embodiments, the database and processor are remotely located on a server and the user interface communicates with the server via a wired or wireless link. The user interface may be a graphical user interface (GUI) incorporating a web browser which enables a user to navigate and view hypertext documents.

The exemplary troubleshooting system provides users with both guidance and flexibility to facilitate self-troubleshooting processes for printers and copiers.

The exemplary method relies on natural language processing (NLP) techniques to annotate a trouble-shooting corpus, in which printer breakdown problems and their solutions have been described in natural language, such as English, with information about synonyms and the boundaries of syntactic units (linguistically coherent expressions). The NLP-based method allows a user to dynamically and iteratively specify queries over this representation of the corpus.

In the exemplary method described herein, the processing of the database content with NLP techniques generates the resources that provide support for iterative query refinement. The use of NLP techniques in a query system offers a new type of interaction to the users with the documents. That is, when a user's initial query returns too many results, the system automatically proposes refinement choices that consist of linguistically coherent expressions, such as words or phrases, extracted from the documents that match the initial query. Since the refinement choices are generated automatically from the documents, the maintenance effort can be much lower than for alternative approaches such as decision trees. Additionally, a user may be able to identify a solution with fewer interaction steps than required for a decision tree that covers all problems in the knowledge base. The linguistically coherent expressions may also be used to improve the ranking of the initial results. For example, more weight may be given to documents that contain multiple query words in a single expression than to those in which the query words are less directly related to each other.

The system and method rely on an indexed corpus of documents which may be generated automatically by a parser. The parser takes an XML or other text document as input and breaks each sentence into a set of linguistically coherent expressions. For example, for the sentence: "White lines when making copies from the document feeder," the parser identifies the expressions "White lines," "when making copies," and "from the document feeder." The parser provides this functionality by applying a set of rules, called a grammar, dedicated to a particular natural language such as French, English, or Japanese. A grammar is written in a formal rule language, and describes the word or phrase configurations that the parser tries to recognize. The basic rule set used to parse basic documents in French, English, or Japanese is called the "core grammar."

When a given set of documents present some recurrent patterns which may induce some errors while processing with the core grammar of a given language, such as tables, complex chemical formulae, etc., the linguist can specialize this core grammar by adding rules which are better suited to analyzing these domain-specific strings. The parser may be specifically designed to simplify the process of enriching a core grammar, due to its incremental, step by step application of the rules. New rules are simply appended to the grammar and only executed at the end of the analysis on the regular output of the core grammar.

The relationships between objects of the index may be stored using presence vectors as described, for example, in above-referenced Published Application No. 20050138000, incorporated herein by reference. This reduces the complexity of the indexing.

In various aspects, a unified representation is used for all the extracted information. This involves putting the extracted information from a document or set of documents into one single format. For example, all the extracted information for an input document is stored with the text as an XML document or in a relational database, which can then be queried with queries in a suitable query language, such as XPath instructions.

With reference to FIG. 1, an exemplary trouble shooting system includes a server 10 and a user interface 12, which communicates with the server 10 via a wired or wireless link 14 to a network such as the Internet. In the illustrated embodiment, the user interface 12 is incorporated into a machine 16, such as a printer, although it is also contemplated that the user interface may be located remote from the machine 16. For example, the user interface 12 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a workstation of a computer network or other computer device such as a personal computer or mobile computer device, such as a PDA, a cell phone, a Tablet PC, a Pocket PC, or other suitable electronic device.

The illustrated user interface 12 includes a display 20, such as a screen, a processor 22, a temporary memory 24, and a hard drive 26, all interconnected by a bus 28. The display 20 serves as a graphical user interface which displays responses to the user's query and query refinement options. A user interacts with the user interface 12 by manipulation of an associated user input device 30, such as (1) a text entry device, such as a keyboard, and/or (2) a pointer, such as a mouse, track ball, pen, touch pad, or a touch screen, stylus, or the like. By manipulation of the user input device 30 a user can enter a query as a text string as well as navigate the screens and other features of the graphical user interface, such as one or more of a toolbar, pop-up windows, scrollbars (a graphical slider that can be set to horizontal or vertical positions along its length), menu bars (a list of options, which may be used to initiate actions presented in a horizontal list), pull downs (a list of options that can be used to present menu sub-options), and other features typically associated with web browsers. In the illustrated embodiment, the user input device includes a keypad 30 for inputting a text string, which may form a part of a user's query and a touch screen 34 associated with the display 20 which communicate with the processor 22 via an input/output device 36.

The external server 10 may be equipped with a processor 50, a memory 52 and a communications interface 54. The processor 50 may include a CPU and ROM, and controls each of structural modules of the external server 10. The communications interface 54 is connected to the network, and implements transmission and reception of various kinds of data to and from a communication interface 56 of the user interface 12. Various kinds of data received by the communications interface 54 are stored in the memory 52.

A memory, which can be the same memory as memory 52 or a separate memory, serves as a document repository. The illustrated memory 52 stores a relational database 58, which includes an annotated set of defined problem statements 60 which each include a problem description 62 and one or more associated solution sequences 64. The problem statements describe problems known to be associated with the machine 16, expressed in natural language. A defined problem description 62 can be a short textual description of a problem that users may experience. For example, it could be the single sentence which describes a problem. In the case of a printer for example, an exemplary problem statement may be "White lines when making copies from the document glass and document feeder." The problem descriptions 62 are linked in the database 58 to a set of defined solution sequences 64, also expressed in natural language. The solution sequences 64 each comprise a sequence of one or more steps for a user to perform in attempting to solve the problem. A solution sequence may be composed of at least two parts: a title, which basically describes what needs to be done, and a description, which gives step by step instructions to the user to fix the problem. Since a problem identified by a user may have more than one root cause, problem statements 60 in the database may include more than one solution sequence, which may be ordered in a list. Additionally, two or more problem statements may be associated with the same solution. The database is indexed according to the normalized forms of the words that occur in the problem statements 60, and their synonyms.

Alternatively, the problem statements may be stored as hypertext documents, such as extensible markup language (XML) documents, which are annotated with tags, which link the problem statements to the associated solutions.

As will be described in greater detail with reference to FIG. 4, the processor 50 includes instructions for dividing a natural language user query that has been input by a user into words and finding lemmas of these words, the user query describing a problem with a machine, and instructions for retrieving problem statements 60 from the memory 52 which contain at least one of the words (or a word with the same lemma form as one of the words), each of the problem statements being associated with at least one solution sequence for addressing the problem with the machine. Additionally, the processor includes instructions for generating refinements to the user's query, (e.g., for focusing the query), in the event that no problem statement matches the entire query. These instructions may include instructions for identifying subparts of the query and for presenting the subparts as query refinements, instructions for presenting expressions from the retrieved problem statements which relate to a selected subpart and which represent different meanings of the user's query for disambiguating user queries, and instructions for presenting alternatives for extension of the user's query as query refinements.

The instructions for the server processor 50 can be instantiated as a computer program product. The computer program product can be a computer readable medium, such as a disk, computer chip, or other electronic storage medium, having a computer readable program code thereon. The computer readable program code causes the server processor to identify the words or other text fragments of an input user query and to generate a search query based on the words. Such a program may include rules, which, when executed by the processor 50, (i) identifies at least some of the words from the user query to form a search query;

(ii) determines normalized forms of the query words;

(iii) retrieves problem statements from an associated memory, each problem statement including at least one word or phrase having a normalized form which is equivalent to that of a word from the search query, each of the problem statements being associated with at least one solution sequence for addressing the problem experienced with the machine; and, (iv) proposes refinements to the user's query, which may include one or more of:

(a) identifying subparts of the user's query and presenting the subparts as query refinements;

(b) where two or more retrieved problem statements are associated with a concept, each expression of this concept including at least one word, presenting an expression of the concept as a query refinement; and (c) presenting alternative extensions as query refinements, each of the alternative extensions including at least a portion of one of the retrieved problem statements, such as a linguistically coherent expression which is linked to a user-selected expression.

While the system has been described in terms of a server 10 and a user interface 12 as separate components remote from each other, it is also contemplated that the database 58 and processor 50 may be incorporated into a single device together with the components of the user interface 12.

Figure 4:
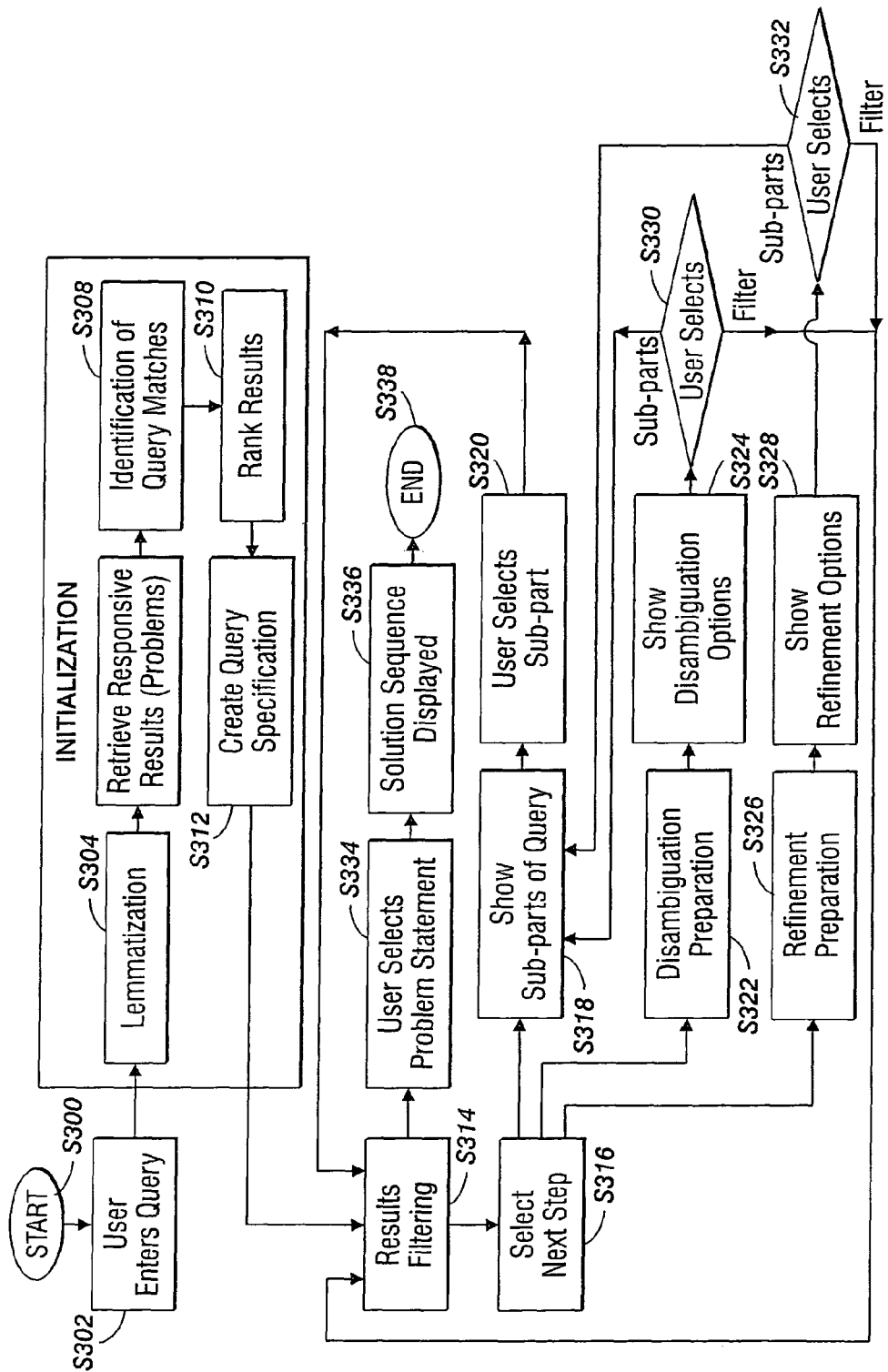
FIG. 4 is a flow diagram of an exemplary method for retrieving documents responsive to a query, which have been annotated by the method of FIG. 3.

An initial indexing of the content of the document repository is generally required, in order to support the dynamic query specification outlined in FIG. 4. This indexing process is specifically designed to store linguistic information. The indexing identifies the syntactic structure of the content of the document repository 58, through the use of the parser.

Figure 2:
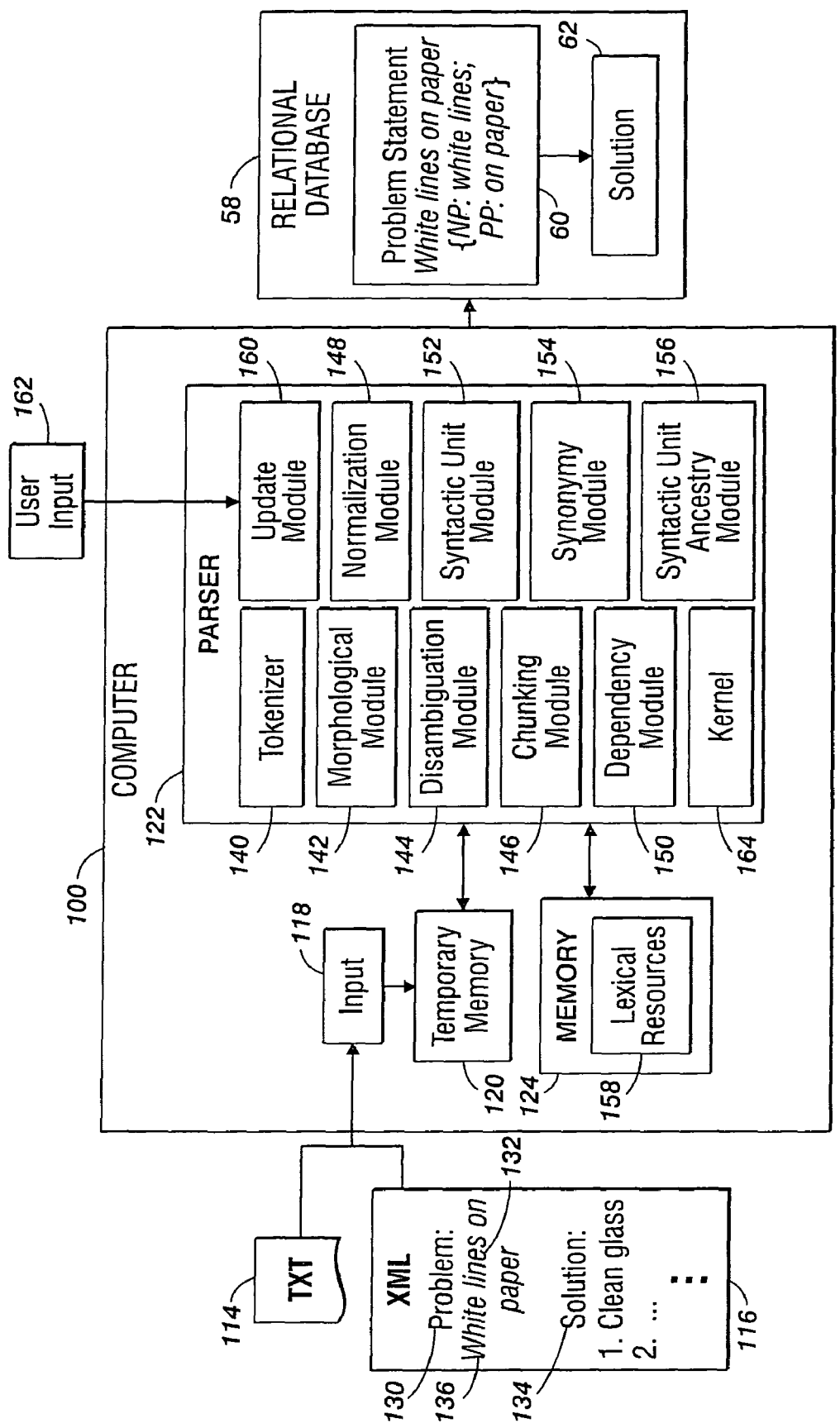
FIG. 2 is a block diagram of an exemplary system for automated annotation of a knowledge base.

With reference to FIG. 2, an exemplary system 100 for indexing (annotating) the troubleshooting documents with tags is shown in the form of a processing device which parses documents 114, 116 which are to form the knowledge base. The annotating system 100 can be a general-purpose computer, such as a desktop PC, a laptop PC, a workstation, a server, or a mainframe computer on which the parser is loaded as software. Alternatively, the annotating system 100 can be a dedicated device. In general, the annotating system 100 can be any device which is capable of performing the steps of the document annotation method outlined in FIG. 3. The annotating system includes an input device 118, which receives input documents, a memory 120, which stores the input documents during processing, a processor or "parser" 122, which processes the input documents and a memory 124, associated with the parser, which stores lexical and grammatical resources 126.

The parser 122 takes as input one or more documents 114, 116 in electronic form and transforms the input documents into annotated documents in a relational database. Each document 114, 116 includes one or more problem statements 130 comprising problem descriptions 132 and accompanying solution sequence(s) 134. As used herein, the term "parser" generally refers to all of the annotation processing instructions which may be utilized in the annotation of the problem statements. The annotation indicates the grammatical structure of the problem statement, allowing for the presentation of linguistically coherent refinement choices. In general, the parser 122 includes instructions for syntactically, semantically, and lexically analyzing the text content of the problem statements 130 (i.e., the problem descriptions 132 and optionally also the solutions 134) and identifying relationships between text fragments in the problem statements 130. The annotated documents are stored in the relational database 58 or in a database as an enriched XML file. The database 58 can be located in any suitable storage medium, such as a disk, hard drive, Internet server, or the like. Along with XML, other structured formats that include structuring schema or other explicit organization can be used to provide a common structured document format for the annotated documents.

The parser 122 annotates the problem statements 130 with tags (labels), which correspond to grammar rules, such as lexical rules, syntactic rules, and semantic rules. Some of the tags may be used to index the documents in the database 58. Lexical rules define relationships between words by the order in which they may occur or the spaces between them. Syntactic rules describe the grammatical relationships between the words, such as noun-verb, adjective-noun. Semantic rules include parent-child dependencies (e.g., subject-verb relationships; object-verb relationships).

In some embodiments, the parser 122 comprises an incremental parser, as described, for example, in above-referenced U.S. Patent Publication Nos. 20050138556 and 20030074187 and in the following references: Aït-Mokhtar, et al., "Incremental Finite-State Parsing," Proceedings of Applied Natural Language Processing, Washington, April 1997; Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997; Aït-Mokhtar, et al., "Robustness Beyond Shallowness Incremental Dependency Parsing," NLE Journal, 2002; and, Aït-Mokhtar, et al., "A Multi-Input Dependency Parser," in Proceedings of Beijing, IWPT 2001. One such parser is the Xerox Incremental Parser (XIP).

The parser 122 illustrated in FIG. 2 includes processing instructions for executing various types of analysis of the text, such as identifying syntactic relationships (dependencies), semantic relationships, and concept matching. For example, the parser 100 may include several modules for linguistic analysis. Each module works on the input text, and in some cases, uses the annotations generated by one of the other modules, and the results of all the modules are used to annotate the problem statements 130. Thus, several different grammar rules may eventually be applied to the same problem statement 130 or fragments (such as words, phrases) 136 thereof. It will be appreciated that a parser may have fewer, more, or different modules than those described herein for the exemplary system.

The exemplary parser modules illustrated in FIG. 2 include a tokenizer module 140, a morphological module 142, a part of speech disambiguation module 144, a chunking module 146, a normalization module 148, a dependency module 150, a syntactic unit module 152; a synonymy module 154, and a syntactic unit ancestry module 156, although it will be appreciated that functions of these modules may be combined as a single unit or that different modules may be utilized.

For a computer, a document is above all a simple sequence of characters, without any notion what a word or a number is. The role of the tokenizer module 140 is to transform this sequence of characters into a sequence of tokens, where a token is a sub-sequence of characters. For example, the tokenizer module 140 identifies the tokens in a text string comprising a problem statement, for example, identifying the words, numbers, punctuation, and other recognizable entities in the text string. The result of the tokenizer is an ordered sequence of tokens.

Once a document has been transformed into a sequence of tokens, the next step is to analyze the lexical nature of the tokens. The morphological module 142 associates features from a list of features, such as indefinite article, noun, verb, etc., with each recognized word or other text fragment in the document. This module may thus attach tags to a word which identify the grammatical role of the word in the sentence. Some words may have more than one label. For example, the word master may be a verb and a noun.

The morphological analysis may be performed with finite-state lexicons. A finite-state lexicon is an automaton which takes as input a token and yields the possible interpretations of that token. A finite-state lexicon stores thousands of tokens together with their word forms in a very compact and efficient way. The morphological module 142 may identify lemma forms and/or stems and/or morphological forms of words used in the document and applies tags to the respective words.

The disambiguation module 144 applies rules to assist in disambiguating words having more than one meaning. Disambiguation may consist of pruning the non-relevant categories for ambiguous words. For instance, the word lines may be analyzed by the morphological module 142 as being both a verb and a noun. Since only one category is valid for a given analysis, one of these analyses (verb, in the previous example) should be removed.

One method for disambiguation is a statistical method, such as the Hidden Markov Model (HMM), which has been trained on large corpora. The result of this training is stored in a specific file which comprises hundreds of sequence of two of three categories, for which disambiguation is provided. For example, the sequence Determiner, Noun is very common in English, while the sequence Determiner, Verb does not exist. The training consists in storing all these sequences which may be found in corpora to apply on sequences of words later on. Due to this information, the sequence the lines can be correctly analyzed as being a sequence of a determiner (the) followed by a noun (lines). The word lines is then simplified to its noun value.

The disambiguation process can also be based on rules, which are written by a grammarian to solve the same problem. In one embodiment, a combination of HMM and rules may be employed since HMM may prove wrong in certain configurations. The rules can then be used to correct wrong results.

The disambiguation module 144 may thus select the most appropriate part of speech (e.g., verb, noun) associated with a word when it appears in a given context. For example, ambiguous words may be semantically disambiguated using the method described in U.S. Pat. No. 6,405,162, incorporated herein by reference in its entirety.

The chunking module 146 groups words around a head. A head may be a noun, a verb, an adjective, or a preposition. Around these categories, the other minor categories, such as determiner, adverb, pronoun, etc., are lumped.

The dependency module 150 identifies syntactic dependencies between chunks, such as subject-verb, verb-preposition, modifier-noun, or other dependencies.

The syntactic unit module 152 identifies syntactic units (linguistically coherent expressions) on the basis of the information provided by the previous modules. A syntactic unit is generally a self-contained expression that is appropriate for presentation to the user as a refinement choice. In general, a syntactic unit is a sequence of words in the same sentence which are grammatically related. For English, syntactic units may be identified according to the following rules.

A noun phrase (NP), prepositional phrase (PP), adverbial phrase (ADVP), or adjectival phrase (AP) chunk is a unit unless subsumed by a larger unit. For example, the NP "the printer" can be a unit itself when it appears as the subject of a sentence, but when it appears within the PP "of the printer," the PP is a unit and the NP is not.

A finite verb plus any associated auxiliary verbs, infinitive verbs, and adverbs constitute a syntactic unit. If the verb has a direct object, then the object NP is also included in the verbal unit. If the verb is a form of "be," then the following predicate (NP or AP) is also included in the unit. For example, the verbal syntactic unit in each of the following sentences is underlined:

The printer breaks.

The printer does not respond.

The printer uses too much toner

The printer is broken.

Syntactic units may appear in contiguous or non contiguous form in a sentence. For example, in the problem statement: "white lines when using the document feeder and the glass," two verbal syntactic units can be identified: "when using the document feeder," and "when using the glass."

The synonymy module 154 adds tags to words or multiword expressions corresponding to acceptable lexical equivalents for the expressions. The lexical equivalents may be retrieved from lexical resources 126 stored in memory 124. Most users are non-technical people who might use a terminology which is different from that of the problem statements stored in the relational database, and even technically sophisticated users might express a single concept using a range of different expressions. The synonymy module therefore may therefore apply synonymy rules, yielding additional terms by which the documents can be indexed. The synonymy rules play two roles: (1) the enrichment of the corpus so that user queries with words unknown in the corpus can be matched; and, (2) the normalization of the corpus so that syntactic units present in different places of the repository and having the same meaning but using a different wording can be grouped together in a unique concept with a normalized representation.

Synonymy rules may take into account information provided by the previous modules in order to make synonym introduction context-dependent. For example, the word "page" may be listed as synonymous with "sheet" in all contexts, whereas the word "change" may be listed as synonymous with "replace" only when the direct object is "cartridge." This rule would apply to the sentence "change the cartridge" but not to the sentence "change the settings."

Two types of synonymies can be created. The first one is a strict synonymy meaning that each expression can be interchanged with the other, and both can be represented by a common normalized form. The second type of synonymy is a looser one where each expression can be an interpretation of the concept, but is not interchangeable with another one. In this case, each representation will have its own normalized form and the concept will be presented as a multiple-choice problem description node to the user during the disambiguation step. This synonymy is used exclusively for enrichment in order to link imprecise user terminology with several possible alternative interpretations in the relational database.

The normalization module 148 tags syntactic units according to their canonical (normalized) form. Syntactic units are mapped to a canonical form so that units that are close in meaning but different in surface form can be grouped together as a single refinement choice. Exemplary rules for normalization are as follows: determiners, forms of the verb "be," and auxiliaries other than "can" and "not" are removed from the problem statement; each of the remaining words is replaced by its lemma followed by its part of speech. For example, the normalized forms of three expressions are shown below:

| Surface Form | Normalized Form |
|---|---|
| printers | printer NOUN |
| were not responding | not AUX respond VERB |
| on copies | copy NOUN |

The syntactic unit ancestry module 156 applies rules for determining parent-child relationships between syntactic units. Various methods are available for determining the parent-child relationships between syntactic units. In one embodiment, a linear strategy is used that consists of making each unit the parent of the unit that follows it. In another embodiment, parent-child relationships are based on the syntactic structure identified by the dependency module: if the head of syntactic unit A is dependent on the head of syntactic unit B, then A is tagged as a child of B. In cases where the dependency graph identified by the parser is not fully connected, links may be added using the linear strategy to join the disconnected subgraphs. For example, for the problem sequence: [malfunctions] [when printing] [from Windows] the dependency strategy would be equivalent to the linear strategy. However, for the sequence: [how to print] [from a workstation] [over netbeui], both [from a workstation] and [over netbeui] would be children of [how to print], assuming that the parser correctly determines that both PPs modify the verb. When the parser yields multiple possible attachments for a single unit, each attachment may be transformed into parent-child links, so the parent-child graph is not necessarily a tree.

The processing instructions for the modules 140, 142, 144, 146, 148, 150, 152, 154, 156 may be stored in a storage medium or kernel, such as memory 164. Those skilled in the art will appreciate that all processing instruction memories of the computer system 10 may be provided separately in the modules or may be integrated into a single memory 164, as illustrated.

An update module 160 or rule compiler allows a user to add lexicon or to add rules to the parser or modify existing rules. The user may communicate with the computer 10 via a user input device 162, such as a keyboard, touch screen, or other suitable device. The user can create as many rules as needed, which can then be accumulated into a specific file. When the parser instructions are launched on a set of documents, these specific grammar files are loaded together with the grammar kernel 146, and the rules they contain are applied to the text at the end of the regular analysis. Each time, one of the rules is applied, a specific dependency is generated as a tag. This tag is interpreted by the system as a specific indication that a fact has been found. Since these tag dependencies are created by the user, it is possible to typify the facts with specific dependencies.

Figure 3:
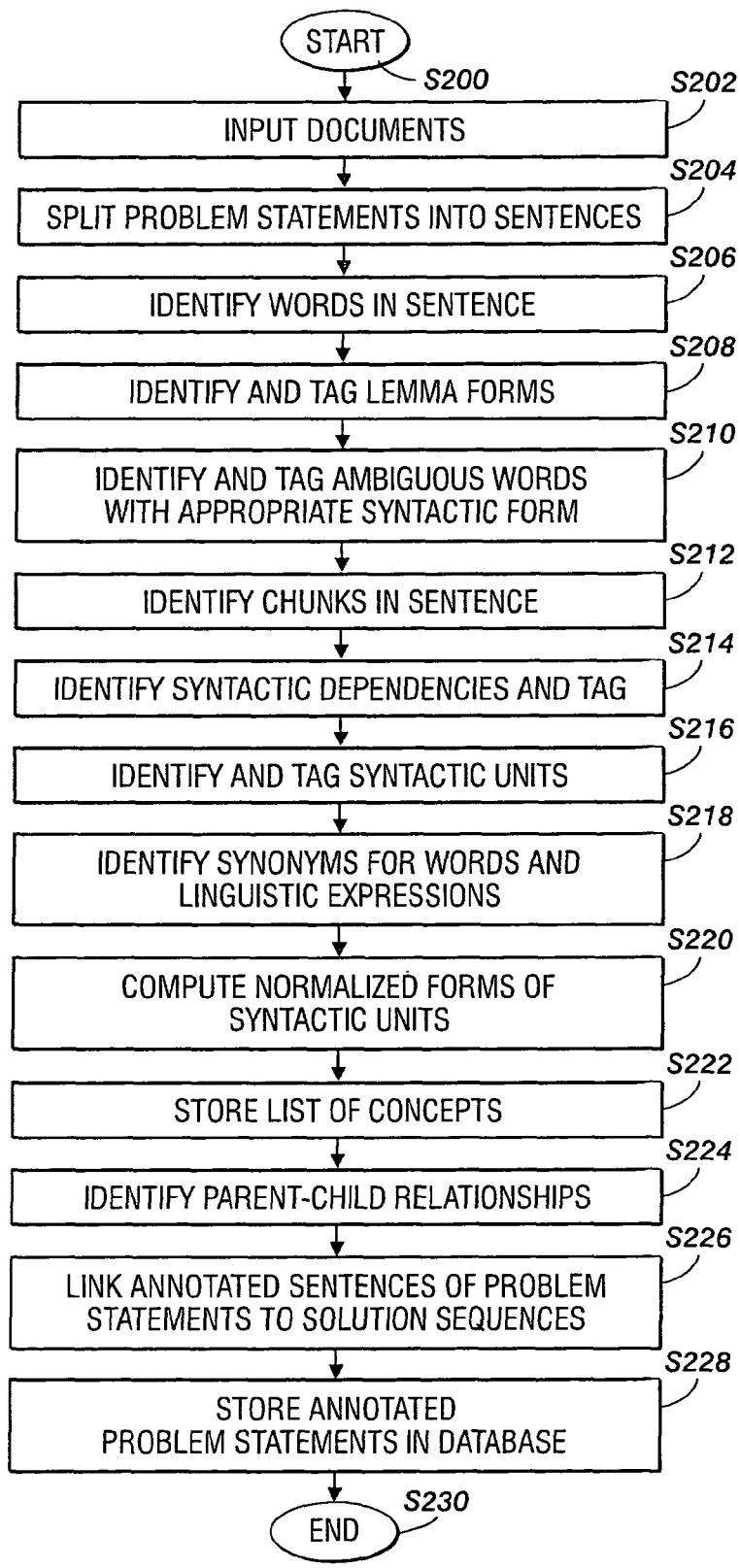
FIG. 3 is a flow diagram of an exemplary method for automated annotation of a knowledge base.

FIG. 3 illustrates the steps in an exemplary annotation method. It is to be appreciated that the method may include fewer or more steps than those illustrated, and that the steps need not be executed in the order described.

The method begins at step S200. At step S202, a user inputs one or more troubleshooting documents comprising problem statements 130, each comprising problem descriptions 132 and associated solutions 134, into the parser.

At step S204, each problem statement is split into sentences. The following steps (S206-S224) are performed on each sentence of the problem description (and optionally also the solution sequence).

At step S206, the sentence is parsed by the tokenizer 140 to identify text fragments, generally words.

At step S208, the lemma and syntactical role of the words in each sentence is identified by the morphological module 142. An index is created that maps each lemma to the set of sentences that contain forms of that word.

At step S210, ambiguous words are disambiguated by the part of speech disambiguation module and tagged with the appropriate lexical form.

At step S212, chunks are identified by the chunking module 146.

At step S214, syntactic dependencies are identified by the dependency module 152.

step S216, the sentence is broken into linguistically coherent expressions by the syntactic unit module.

At step S218, synonyms are added to the representation of each sentence by the synonymy module.

At step S220, the normalized form of each syntactic unit is computed by the normalization module.

At step S222, a list of "concepts" included in the sentence is stored. A concept is an equivalence class of syntactic units. Two syntactic units belong to the same concept if they have the same normalized form, which indicates that the units are synonymous, or that each is a paraphrase of the other.

At step S224, parent-child relationships between syntactic units in the sentences are identified by the syntactic unit ancestry module. Exemplary criteria for determining parent-child relationships are described above.

It will be appreciated that some of the steps of the method may be recursive.

At step S226 the annotated sentences of the problem descriptions are linked to the corresponding solution sequences.

At step S228, the annotated sentences are stored in the database, along with tags indicating the lemmas of the words of the sentence, the lemmas of any synonyms detected, the extent of the syntactic units identified, and the parent-child links among these syntactic units. The method ends at step S230.

It will be appreciated that the parser 122 may identify other information from the text strings than that specifically listed herein.

While the above description refers particularly to the annotation of troubleshooting documents, it will be appreciated that the system may be used for other documents which are to form a searchable corpus.

All of the above steps illustrated in FIG. 3 may be performed prior to a user submitting a query. Since the annotation process may take some time, it is desirable for the documents to be analyzed prior to entering a query. Additionally it allows the more computationally time consuming steps to be performed by a computer 100 with a large processing capability, whereas the retrieval may be performed by a processor 50 with a much smaller processing capability. However, it is also contemplated that the documents may be annotated after submission of the query and may be annotated by the processor 50 that performs the retrieval.

Example of Annotation of Problem Descriptions

As an illustration of how sentences (problem descriptions in the present case) may be indexed, the following two sentences which represent problem descriptions to be stored in the repository will be considered:

1. White lines when making copies from the document glass and document feeder.
2. White lines when copying from the document feeder only.

The parser 122 first identifies the tokens (Steps S204, S206). The tokens identified for sentence 1), where each token is enclosed in <> may be:

<white><lines><when><making><copies><from><the><document><glass><and><document><feeder><.>

The lemma forms of the words (chunks) identified at step S208 for sentence 1 may be:

<white><line><when><make><copy><from><the><document><glass><and><document><feeder>

The lemma forms of words identified for sentence 2 may be:

<white><line><when><copy><from><the><document><feeder><only>

The syntactic units stored for sentence 1 at Step S212 may be:

| Surface Form | Words | Normalized Form |
| --- | --- | --- |
| white lines | [white, line] | white ADJ line NOUN |
| when making copies | [when, make, copy] | make VERB copy NOUN |
| from the document | [from, the, document, | document NOUN |
| glass | glass] | glass NOUN |
| and document | [and, document, | document NOUN |
| feeder | feeder] | feeder NOUN. |

The syntactic units stored for sentence 2 may be:

| Surface Form | Words | Normalized Form |
| --- | --- | --- |
| white lines | [white, line] | white ADJ line NOUN |
| when copying | [when, copy] | copy VERB |
| from the document | [from, the, document, | document NOUN |
| feeder | feeder] | feeder NOUN |
| only | [only] | only ADV |

The concepts identified within sentences 1 and 2 at step S216 are:

white line; copy; document glass; document feeder.
    white line; copy; document feeder; only.

The parent/child relationship defined within sentence 1 are:

a. "white lines"→"when copying"
    b. "when copying"→"from document glass"
    c. "when copying"→"from document feeder"

With reference to FIG. 4, steps of an exemplary method for retrieval of solutions to problems identified through a user query are illustrated. During a troubleshooting session a user can incrementally specify a formulation of the problem with a query in the user's own natural language (English in the illustrated embodiment). It is to be appreciated that the method may include fewer or more steps than those illustrated and that the steps need not be executed in the order described.

The method begins at step S300 when a user identifies a problem with the machine 16. At step S302, the user expresses the problem as a query by entering a word or text string via the user interface 12. The user specifies a formulation of the problem to troubleshoot as a user query in his or her own language. An example of such a formulation could be the query: lines on the page. This query is communicated to the server 10 and then the server processor 50 performs a first search using the user query. Depending on the results, the processor 50 builds a first query specification and determines the next step to be proposed to the user. This initialization step for translating the user natural language query into a first query specification is described below. The initial query specification can then be enriched through several types of iterations, which are also described.

When the query is received by the server 10, a search of the database is initialized by the processor 50. The initialization phase may include the following steps: lemmatization (step S304), retrieval of responsive results (problem statements) (step S306), identification of query matches (step S308), ranking of query matches (step S310), and creation of an initial query specification (step S312). These steps may be followed by the iterative construction of a query (a problem description in the exemplary embodiment) using both user input and data indexed from the linguistic processing of the documents of the repository (descriptions of problems and their associated solutions in the exemplary embodiment).

The lemmatization step (S304) may include extracting, from the input string, text fragments, such as words, to search. The query entered by the user is lemmatized into a list of lemmas. In the case of the lines on the page query, the list of words will be: line, on, the, page.

At step S306, the server processor 50 retrieves all the sentences containing at least one word of the query in their text or enriched corpus, (e.g., sentences which include words with the same lemma as a query word or one of its synonyms—i.e., an equivalent normalized form) from the repository 58. The responses comprise problem statements in the form of text strings. The number of responses may be displayed on the user interface display 20. These sentences are kept in memory 52 and constitute the initial set of results. Each problem statement 60 becomes one search result.

The identification of the query matches (step S308) may include, for each matching sentence, the following steps.
  d. For each word of the query which did not match previously:
    i. The processor looks for the sentence concepts comprising this word;
    ii. If a concept is found, the processor determines if this concept contains other words from the query; and,
    iii. The concept is stored together with the query words it matches.
  e. Query match objects are created from the list of detected matching concepts. All the matching concepts that are linked together by a parent/child dependency are grouped in the same query match. A query match is therefore a list of concepts linked together and matching words from the user query.

At the end of this step, each matching sentence is associated with one or more query match objects.

In the ranking of the query matches (step S310), the query matches identified in step S308 may be ranked according to predetermined criteria. Exemplary criteria include:
  The higher the number of query words matching the query match, the better (higher) the query match is ranked. In other words, query matches that include the largest number of words from the user query are favored. For query matches comprising the same number of query words, the lower the number of concepts contained in a query match, the better (higher) the query match is ranked. This accounts for the probability that query matches that comprise some words from the user query in a very short/compact description are more precise.

A ranking which employs a weighting of these two criteria may be employed. For example, using the two criteria, query matches can be ranked such that two of them are equally ranked only if they comprise the same number of words from the user query and comprise the same number of concepts.

Finally the result problem statements are sorted in descending order according to their score. No additional threshold needs to be applied to the problem statements with lowest score since a subsequent refinement process reduces this initial list of results. The resulting problem statement ranking enables the user to see the most relevant problem descriptions on top of the list even in the first steps of the refinements when a lot of problem statements are potentially matching the user's query description.

In the creation of the first query specification (step S312), each query match is used to create a first query specification, which is a tree where nodes represent concepts. Each concept from the query match is translated into a node and the child/parent relationships between the concepts can be used to link these nodes accordingly. When two query matches are equally ranked (i.e., they include the same number of words from the user query and comprise the same number of concepts), the processor attempts to merge them into a common query specification.

Figure 5:
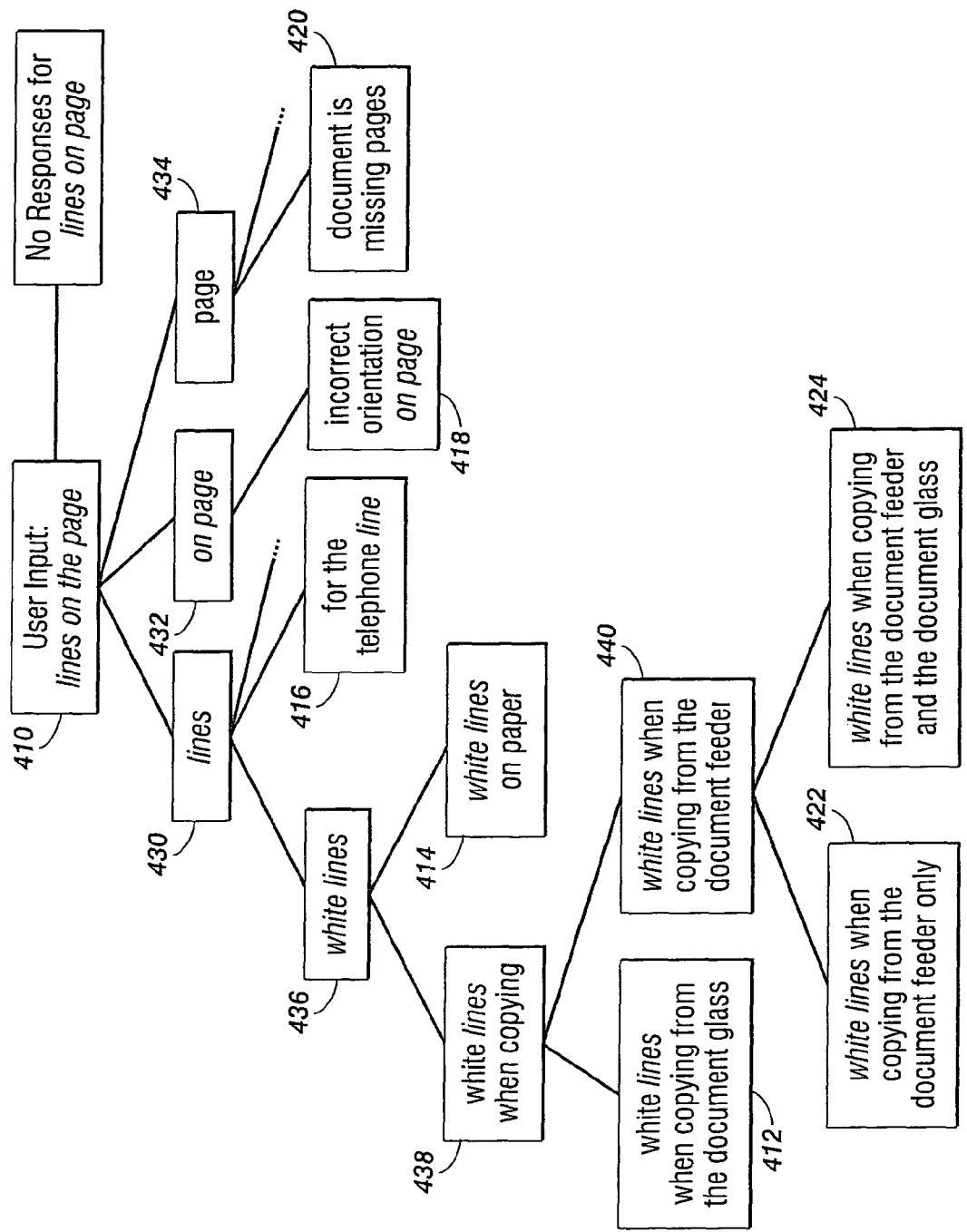
FIG. 5 illustrates a tree-structured query response result.

As an example, illustrated in FIG. 5, for the user query: "lines on the page," one possible query match may contain only the concept "white lines," which includes the word "line" from the user query, and another query match may only contain the concept "for the telephone line," which also includes the word "line." Since they share the user query word "line," the two query matches can be merged into a query specification composed of a single multiple-choice node where the two alternatives are "white lines" and "for the telephone line." That is, multiple-choice nodes are nodes representing multiple syntactic units for the same description. Later on in the process (steps S322 and S324), the user will be able to choose among them during a disambiguation step.

This example illustrates a merge of two query matches with one single concept, but the same operation can apply to query matches containing several concepts. Merging is possible if each concept from one of the query matches can be merged with one concept from the other one. At the end of this phase, all the query matches have been transformed into potential initial query specifications.

The query specification may be modeled as a tree where nodes represent concepts. For example, FIG. 5 illustrates an exemplary tree structure for the user query 410 lines on the page. In this example, there are no complete matches for the query phrase. However, the processor identifies several query matches 412, 414, 416, 418, 420, 422, 424 which are structured under the concepts 430, 432, 434: lines, on page, and page. It will be appreciated that not all query matches are illustrated in this example. Some of the concepts 430,434 are multiple choice nodes because they include more than one query match. Some concepts 430 may lead to sub-concepts or refinement choices 346, 438, 440.

At step S314, the results are filtered. In this step, each sentence matching the initial user query is then filtered with the currently constructed query specification (created at step S312). A sentence is kept only if it contains all the syntactic units represented by one of the paths of the query specification tree, from a root to a leaf.

Depending on the responses to the created query specification, if there is more than one problem statement which is at least partially responsive to the query, one of the following query refinement steps may be proposed to the user at step S316: a disambiguation, a refinement, or a selection of a sub-part of the problem description.
  Select a sub-part of the query: This step is proposed when the query of the user cannot be entirely matched with the indexed content, but sub-parts of the query can be matched. For example, if the initialization phase leads to several query specifications issued from query matches that are equally ranked, the system proposes that the user continues the specification of the query using only one of the sub-parts of his or her initial query. If accepted by the user, the method moves to steps S318 and S320.

Disambiguate the query specification: This step is proposed when a part of the user initial query can be matched with several problem statements in the index, each of which has a different meaning. For example, if the initialization phase leads to one single highest ranked query specification, which contains some multiple-choice concepts, the system prompts the user for a disambiguation step. If selected, the method moves to step S322. The user is asked to select the appropriate ones for the query specification (step S324).

Refine the query specification: If no disambiguation needs to be performed then the system presents to the user some available query specification refinement options (step S326). If this is selected, the system suggests some possible extensions for the current query specification (steps S326, S328).

If the user chooses one of these options, the process enters in a new iteration to further specify the query, in order to reduce the solution space. Alternatively, the user may choose to reformulate the query, then starting a new interaction (at step S302 in FIG. 4).

In general, sub-part selection step (steps S318, S320) is the first of the three choices to be proposed, since if no responses include all of the search terms, the search is not readily refined. For example, at step S318, the processor displays the subparts of the query, in the illustrated example, lines and page. The user is prompted to choose one of the possible initial query specifications constructed from the user query and the user may select one of these. The method then returns to step S314 for a refinement of the query specification. In the case of the "lines on the page" query, if we suppose that no specification can be built with all the words from the query, the user may be prompted to select one of the specifications built from the sub-parts of the query (e.g., "lines" or "page"). When the user chooses one of the proposed alternatives then the system shows the results for this alternative (S314) and computes the next step (step S316).

At step S322, the processor identifies concepts corresponding to different meanings of the query terms, where present. These are presented to the user at step S320. At step S330, the user may select one of the meanings, for example, by pointing and clicking on a check box associated with the displayed meaning. The method may then return to step S314. Or the user may choose to return to step S318 if he finds none of the choices appropriate. For each node from the initial query specification when a multiple choice is possible, the user can remove the concept descriptions which are not relevant. The current query specification is updated and results are filtered out. For example, in the case of the lines on the page query, examples of possible disambiguation options could be:

how to enable printer line daemon
for the telephone line
white lines

If at step S316 no disambiguation is necessary (or has already been performed), the processor at step S326 identifies ways to refine the query and at step S328, presents these to the user. The user may select the most appropriate refinement (step S332) and the method returns to step S314. This step is generally performed once the initial query specification built from the user query has been selected and completely disambiguated. The system then proposes additional refinements to the user. A refinement is an extension of the current query specification tree with some additional nodes. For example, if the current specification is the disambiguated single node tree "White lines" then a refinement could be "White lines when copying." The way these refinements are computed may be as follows: For each node from the current query specification:

f. For each concept child from the concept(s) represented by the node:
  i. A copy of the query specification tree is created;
  ii. A new node is created for the child and appended to the tree;
  iii. If it already exists in the list of possible refinements or if the filtered results for this query specification would lead to an empty list, the specification is discarded; and,
  iv. Otherwise the process is recursively applied to the new specification until the number of results that would be found by the filtering using the consecutive additional refinements is smaller than the number of results found in the new specification. The last generated query specification that did not reach the stop condition is added to the list of possible refinements.

g. For each concept parent from the concept(s) represented by the node:
  i. A copy of the query specification tree is created;
  ii. A new node is created for the parent and inserted into the tree;
  iii. If it already exists in the list of possible refinements or if the filtered results for this specification would lead to an empty list, the specification is discarded; and,
  iv. Otherwise the process is recursively applied to the new specification until the number of results that would be found by the filtering using the consecutive additional refinements is smaller than the number of results found in the new specification. The last generated query specification that did not reach the stop condition is added to the list of possible refinements.

When the user selects one of the proposed refinements, it becomes the new query specification and the results are filtered according to this query specification (Step S314). Another refinement could then be proposed to the user (Step S326). For example, if the query specification "white lines" has been refined with "with lines when copying" then the new refinement proposed to the user could be: "white lines when copying from the document glass."

Once the processor has identified problem statements which match the user's initial query or refined query, the user may select one of the problem statements retrieved. For example, at step S334, the user selects, from the set of displayed problem statements, a problem statement which best represents the users query. The problem statements may be viewed, for example, on the GUI with a scroll down tool, where there are several problem statements listed. The solution steps for addressing the query are then displayed at step S336. The user may then follow the sequence of steps. Where more than one solution has been identified, the processor may prompt the user to try one set of solution steps first (usually the easiest), and, if that is not effective, to follow a second sequence of solution steps, and so forth. The method ends at step S338.

The troubleshooting system may include other forms of query refinement: for a few large categories of problem statements (e.g., those relating to image quality problems). For example, the system may include a number of hard-coded questions (e.g., "when does the problem occur? When printing/when copying/when faxing"). In general, however, refinement questions are generated dynamically based on the results of a particular query, rather than hard-coded in advance, which improves identification of problem statement and their solutions.

While the exemplary method has been described with respect to a troubleshooting method, it is to be appreciated that the method may also be employed to retrieve text strings, such as sentences, from an indexed corpus which are responsive to a user's natural language query.

Without intending to limit the scope of the exemplary embodiment, the following example illustrates the operation of the system and method on a graphical user interface embodied in a web browser of a Personal Computer.

EXAMPLE

Figure 6:
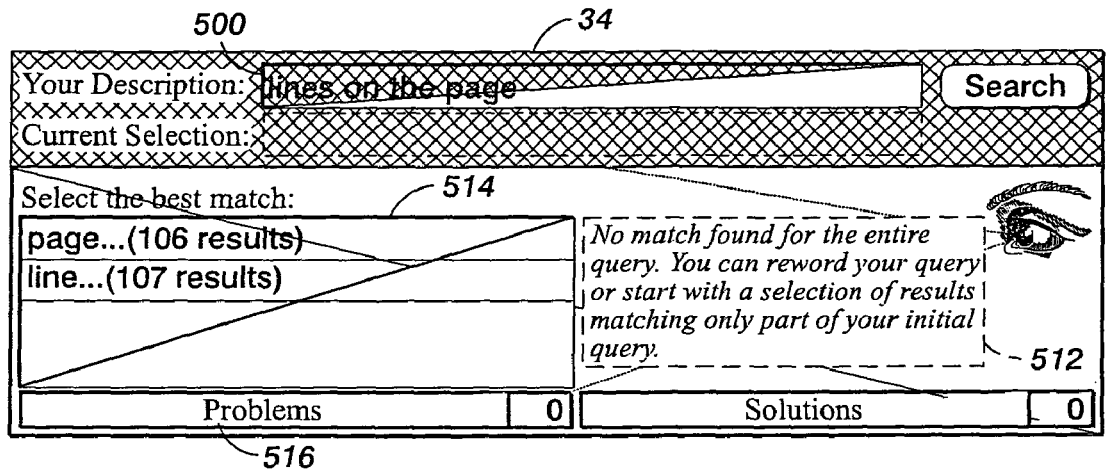
FIG. 6 illustrates a graphical user interface displaying an initial user query and a sub-part of a query selection.

This example assumes that the index database has been created as described above. It can then be used for supporting query specification and search for associated results. A web application server retrieves the content from the index database and provides a web interface to users in order to support the troubleshooting sessions. As an example the scenario of a user experiencing a print quality problem will be considered. In this scenario the user chooses to express the problem by the query "lines on the page." As shown in FIG. 6, the query is displayed in a display box 500. In the illustrated case, the user query is not identified as a whole in any of the problem statement sentences in the relational database 58, as indicated to the user in a comments box 512. Specifically, the processor has not identified any responses which include normalized forms of both page and lines or of words, which are indexed in the database as being synonymous with these words.

Therefore, following initialization, the first step proposed to the user is to select a sub-part of the query to focus the search, as illustrated in a next step box 514. At this stage, there are no problem solutions identified as responsive.

The user's query may be entered on a keyboard or keypad 30. To select specific options, the user may touch the appropriate box on a touch screen 34. In other embodiments, a user may move a mouse to place the cursor at the correct place on the screen and press the left click of the mouse to check the box or press a direction arrow on a keyboard. However, it is to be appreciated that the user input device 30, 34 can include any known or later developed device that is capable of inputting a query and highlighting a location in a displayed document.

Figure 7:
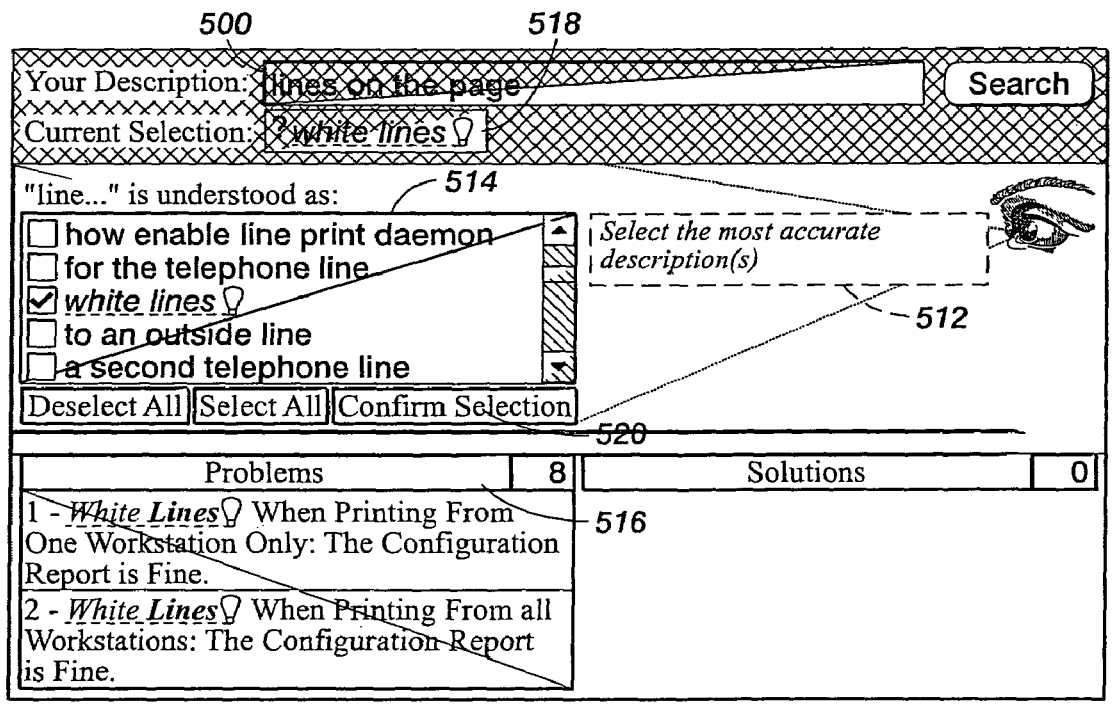
FIG. 7 illustrates a disambiguation step in query selection.

The user can choose to focus on "page" or on "line." It will be assumed that the user selects "line" with its associated 107 results. As "line" has a very broad meaning, a disambiguation step is then proposed to the user, as shown in FIG. 7, where the possible interpretations are shown. For example, "line" can be understood as referring to the "telephone line." Suppose now that the user selects the only one that seems to match his problem (i.e. "white lines)," thus narrowing the results set down to eight entries. This current selection is displayed in a current selection box 518 (FIG. 7). The eight problem statements which include the current selection are displayed in the problem statement box 516.

Figure 8:
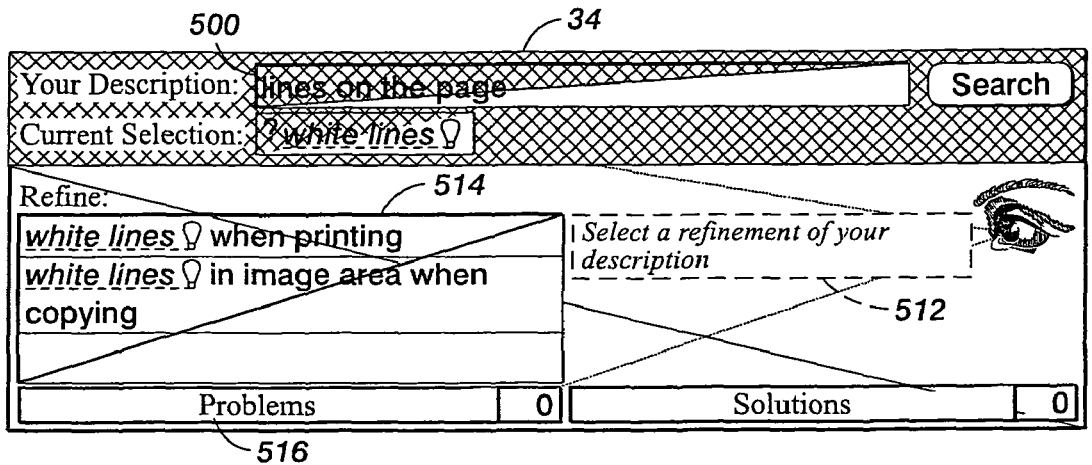
FIG. 8 illustrates a first refinement step.
Figure 9:
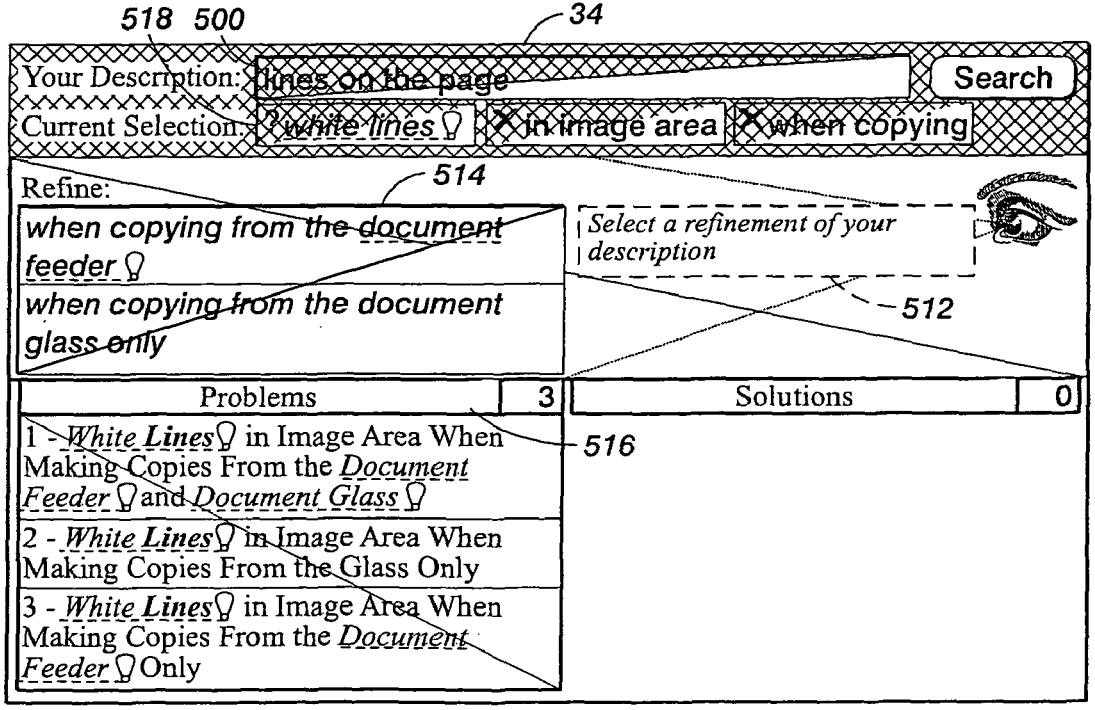
FIG. 9 illustrates a second refinement step.

Once the disambiguation choice has been confirmed (by checking a "Confirm Selection" button 520 in FIG. 7), a first refinement step is proposed to the user (FIG. 8). Two alternative refinements are dynamically constructed from the remaining results so that the user can differentiate between problems happening "when printing" or "when copying." If the user selects "when copying," this narrows the result set down to three possibilities, and an additional refinement is proposed (FIG. 9). The user can select if it is "when copying" "from the document feeder" or "from the document glass."

Figure 10:
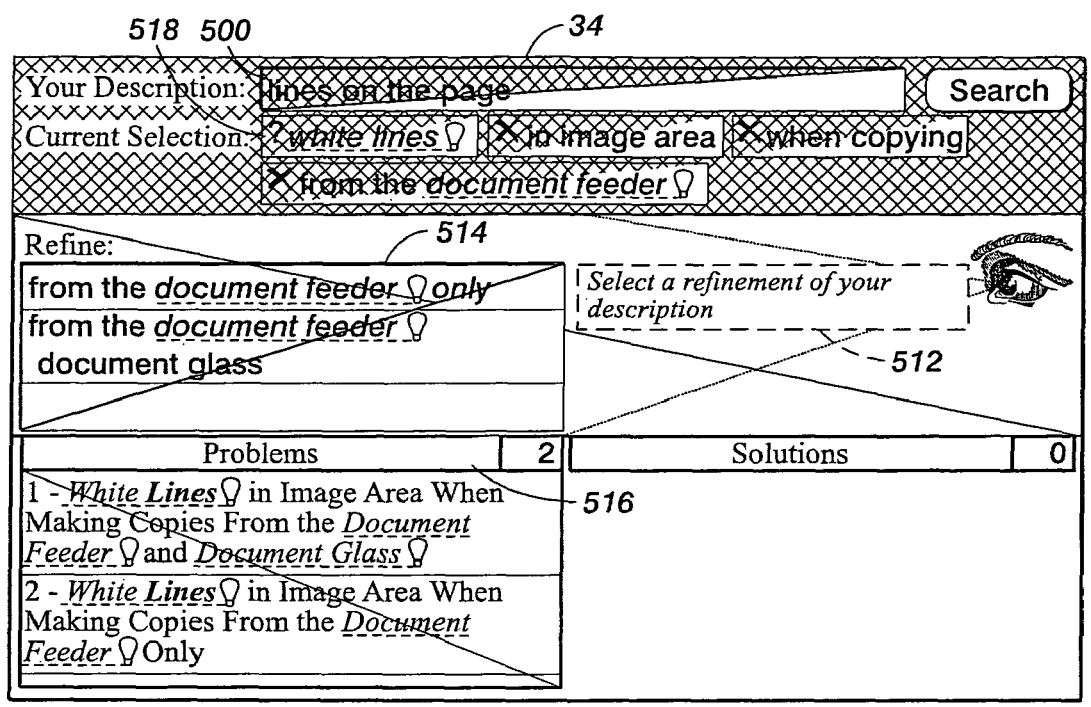
FIG. 10 illustrates a third refinement step.

If the user selects "from the document feeder," a final refinement is proposed to differentiate the two last remaining possible problem descriptions: "from the document feeder only" or "from the document feeder" and "document glass" (FIG. 10).

Figure 11:
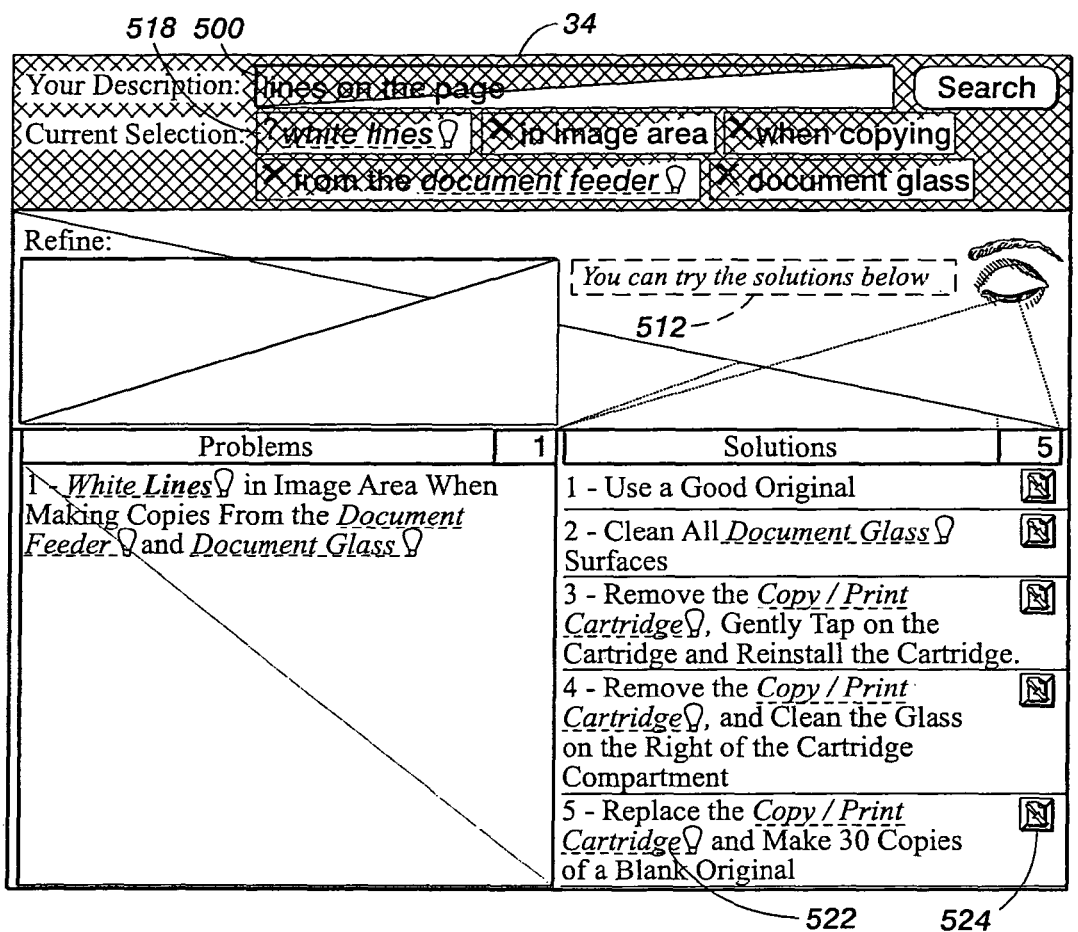
FIG. 11 illustrates the selection of a problem statement and the display of a list of solutions.

Finally the user selects "from the document feeder and document glass" and the system proposes the unique case matching his description with the list of solutions relevant for this problem in a solutions box 522 (FIG. 11). In the illustrated case, five solutions are proposed. In general the simplest or most common solutions are listed first. The user may click on a further information box 524 to obtain further details on the solution.

This scenario shows how a user can choose to follow the proposed refinement process to the identification of a unique case. However, a user may consult one of the results proposed in the list before any other refinement step is proposed. The user may also decide to go back to a previous step of the process or to reformulate a query if the ongoing process does not lead to satisfactory results.

The exemplary system enables a manufacturer to reduce support costs by encouraging customers to self-troubleshoot the problems they encounter with machines using online troubleshooting tools. This can be more cost effective than providing support over the phone or having a service engineer visit the customer's site, while providing a tool which is easier to use than conventional search engines. This, in turn, should encourage the users to self-troubleshoot their problems by providing the tools they which allow them to express their problems easily and to identify the appropriate solutions. Moreover the possibility of fixing a problem without having to wait for the visit of a service engineer is a benefit for a customer.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art, which are also intended to be encompassed by the following claims.

The invention claimed is:

1. A troubleshooting system comprising:
   memory which stores instructions comprising:
   instructions for identifying normalized forms of at least some of the words of a natural language user query input by a user, the user query describing a problem experienced with a machine,
   instructions for retrieving problem statements from an associated memory, the associated memory including a set of problem statements, the problem statements each being stored as a sequence of linguistically coherent expressions, each expression comprising at least one syntactic unit, and identified parent-child relationships between the syntactic units of a problem statement, each expression having a normalized representation, whereby expressions of retrieved problem statements with the same meaning are presentable as a common normalized representation, each of the retrieved problem statements including at least one word with a normalized form which is recognized as equivalent to one of the identified normalized forms of the user query, each of the retrieved problem statements being associated with at least one solution sequence for addressing the problem with the machine;
   instructions for refining the user's query comprising:
   (i) instructions for presenting subparts of the user's query as alternate queries and for receiving a user-selected one of the alternate queries, (ii) instructions for presenting a plurality of the expressions as query refinements and for generating a refined query based on a selected one of the expressions, each of the expressions representing a different meaning of a user query or of a user-selected alternate query, where selected at (i), and (iii) instructions for presenting extensions to the refined query as alternate query refinements, the query extensions being generated by appending an expression which is in a stored parent-child relationship with an expression having the same normalized representation as the expression selected in (ii); and a processor which executes the instructions.

2. The system of claim 1, wherein each of the presented expressions includes at least one word or phrase with a normalized form which is tagged in the associated memory as being equivalent to the normalized form of a word of the user query or refined user query, where generated.

3. The system of claim 2, wherein the normalized forms tagged as equivalent include normalized forms which are recognized as synonyms of the normalized form of an identified query word or group of query words.

4. The system of claim 1, wherein the syntactic units are selected from the group consisting of noun phrases, prepositional phrases, adverbial phrases, adjectival phrases, and verbal syntactic units.

5. The system of claim 1, further comprising a memory which stores a plurality of problem statements tagged with corresponding grammar rules, each of the problem statements comprising at least one solution sequence describing a solution for addressing the problem.

6. The system of claim 1, further comprising a ranking module which ranks retrieved problem statements according to at least one predetermined ranking criterion.

7. The system of claim 1, further comprising instructions for identifying query matches and for ranking the query matches to determine whether to present a plurality of expressions to the user as query refinements, each query match including at least one of the normalized form of the query word and a concept which includes the word.

8. The system of claim 7, wherein the system is a web-based system and the processor is located on a server and wherein the user interface is remote from the server.

9. The system of claim 8, further comprising a user interface which is incorporated into the printer, the user interface communicating with the processor.

10. The system of claim 7, wherein the user interface comprises a graphical user interface and a web browser.

11. The system of claim 1, further comprising a user interface in communication with the processor which enables a user to input a user query and select presented query refinement alternatives.

12. The system of claim 1, wherein the machine comprises a printer.

13. A troubleshooting system comprising:
memory which stores instructions comprising:
    instructions for identifying normalized forms of at least some of the words of a natural language user query input by a user, the user query describing a problem experienced with a machine,
    instructions for retrieving problem statements from an associated memory, each of the retrieved problem statements including at least one word with a normalized form which is recognized as equivalent to one of the identified normalized forms, each of the retrieved problem statements being associated with at least one solution sequence for addressing the problem with the machine;
    instructions for refining the user's query comprising:
        (i) instructions for presenting subparts of the user's query as alternate queries,
        (ii) instructions for presenting a plurality of expressions as query refinements and for generating a refined query based on a selected one of the expressions, each of the expressions representing a different meaning of a user query or of an alternate query, where generated, and
        (iii) instructions for identifying query matches and for ranking the query matches to determine whether to present a plurality of expressions to the user as query refinements, each query match including at least one of the normalized form of the query word and a concept which includes the word, the instructions for ranking the query matches including:
            instructions for ranking the problem statements according to the number of query words in the user query for which a query match is found in the problem statement; and
            instructions for ranking query matches comprising the same number of query words, which rank a retrieved problem statement higher, the lower the number of syntactic units contained in the query match; and
    a processor which executes the instructions.

14. The system of claim 13, wherein each of the problem statements in the associated memory is decomposed according to syntactic units included in the problem statement, each of the presented expressions comprising at least one syntactic unit.

15. The system of claim 13, further comprising instructions for presenting extensions of a user query or of a refined query, where generated, as alternate query refinements, including instructions for appending to the user query or refined query at least one syntactic unit from a retrieved problem statement which is in a predefined parent-child relationship with at least one word of the user query or refined query.

16. A method for retrieving text strings responsive to a user's query comprising:
(a) identifying normalized forms of at least some of the words of a natural language user query input by a user,
(b) retrieving text strings from an associated memory, each text string being stored in memory as a sequence of linguistically coherent expressions, each expression comprising at least one syntactic unit, identified parent-child relationships between the syntactic units of a text string also being stored, each expression having a normalized representation, whereby expressions of retrieved problem statements with the same meaning are presentable as a common normalized representation, each of the retrieved text strings including at least one word with a normalized form which is recognized as equivalent to one of the identified normalized forms; and
(c) where more than one text string is retrieved, refining the user's query comprising selecting at least one of three available query refinements and presenting it to the user, the available query refinements comprising:
    (i) presenting subparts of the user's query as alternate queries,
    (ii) presenting a plurality of the expressions as query refinements, each of the expressions representing a different meaning of a user query or of a user-selected alternate query, and (iii) presenting extensions of a user-selected query refinement as alternate query refinements and generating a refined query based on a selected one of the alternate query refinements, the extensions being based on the stored parent-child relationships of expressions grouped as a concept that have the same normalized representation as the user-selected query refinement; and wherein instructions for the selecting from the three available query refinements and instructions for presenting each of the three available query refinements, when selected, are stored in memory.

17. The method of claim 16, wherein the presenting of subparts of the user's query as alternate queries is performed where none of the retrieved text strings includes normalized forms of all the query words.

18. The method of claim 16, wherein when the user is presented with subparts of the user's query as alternate queries, the presenting of the plurality of expressions is performed after a user has selected one of the alternate queries.

19. The method of claim 16, wherein the presenting a plurality of the expressions is performed when a plurality of different meanings of a user query or of an alternate query are identified.

20. The method of claim 16, wherein the presenting of extensions of a query refinement includes appending to the user query or refined query at least one syntactic unit from a retrieved problem statement which is in a parent-child relationship with at least one word of the user query or refined query.

21. The method of claim 16, wherein the identifying of normalized forms recognized as equivalent includes identifying normalized forms which are recognized as synonyms of the normalized form of an identified query word or group of query words.

22. The method of claim 16, further comprising ranking retrieved problem statements according to at least one predetermined ranking criterion.

23. The method of claim 16, further comprising inputting the user query on a user interface and retrieving the text fragments from a memory associated with a server which is remote from the user interface.

24. The method of claim 23, further comprising:
displaying at least a portion of the retrieved text fragments for selection of a user.

25. The method of claim 16, wherein the text fragments comprise problem statements relating to a problem with a device.

26. The method of claim 25, further comprising:
displaying a solution sequence associated with a retrieved problem statement selected by the user.

27. A system comprising memory which stores instructions for performing the method of claim 16 and a processor for executing the instructions.

28. A system for retrieving text strings responsive to a user query comprising:
a memory which stores indexed text strings, each of the text strings being stored as a sequence of linguistically coherent expressions, each expression comprising at least one syntactic unit, identified parent-child relationships between the syntactic units of a text string also being stored, wherein expressions with the same meaning are presentable as a common normalized representation;
a processor which identifies normalized forms of at least some of the words of a natural language user query input by a user and retrieves text strings from the memory, each of the retrieved text strings including at least one word with a normalized form which is indexed as being equivalent to one of the identified normalized forms, and, where more than one text string is retrieved, refining the user's query comprising at least one of three available refinements comprising:
(i) presenting subparts of the user's query as alternate queries;
(ii) presenting a plurality of the expressions as query refinements, each of the expressions representing a different meaning of a user query or of an alternate query; and
(iii) presenting extensions of a user-selected query refinement as alternate query refinements and generating a refined query based on a selected one of the alternate query refinements, the extensions being based on the stored parent-child relationships of expressions grouped as a concept that have the same normalized representation as the user-selected query refinement;
wherein instructions for the presenting of each of the available query refinements are stored in memory.

29. A non-transitory storage medium storing instructions which when executed by an associated processor:
(a) identify normalized forms of at least some of the words of a natural language user query input by a user, the user query describing a problem experienced with a machine,
(b) retrieve problem statements from an associated memory, the associated memory including a set of problem statements, the problem statements each being stored as a sequence of linguistically coherent expressions, each expression comprising at least one syntactic unit, and identified parent-child relationships between the syntactic units of a problem statement, each expression having a normalized representation, whereby expressions of retrieved problem statements with the same meaning are presentable as a common normalized representation, each of the retrieved problem statements including at least one word with a normalized form which is recognized as equivalent to one of the identified normalized forms, each of the retrieved problem statements being associated with at least one solution sequence for addressing the problem with the machine; and
(c) where more than one problem statement is retrieved, refining the user's query comprising presenting at least one query refinement of a set of available query refinements comprising:
(i) presenting subparts of the user's query as alternate queries;
(ii) presenting a plurality of expressions as query refinements, each of the expressions representing a different meaning of a user query or of an user-selected alternate query; and
(iii) presenting extensions of a user-selected query refinement as alternate query refinements and generating a refined query based on a selected one of the alternate query refinements, the extensions being based on the stored parent-child relationships of expressions grouped as a concept that have the same normalized representation as the user-selected query refinement;
wherein the non-transitory memory stores instructions for presenting each of the set of available query refinements.

* * * * *